(12) United States Patent
Avula et al.

(10) Patent No.: US 9,301,280 B2
(45) Date of Patent: Mar. 29, 2016

(54) OPTIMIZING PAGING BASED ON SERVICES

(71) Applicant: Verizon Patent and Licensing Inc., Arlington, VA (US)

(72) Inventors: Niranjan B. Avula, Frisco, TX (US); Imtiyaz Shaikh, Irving, TX (US); Priscilla Lau, Fremont, CA (US); Maria G. Lam, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 173 days.

(21) Appl. No.: 14/058,776

(22) Filed: Oct. 21, 2013

(65) Prior Publication Data

US 2015/0110006 A1 Apr. 23, 2015

Related U.S. Application Data

(60) Provisional application No. 61/885,869, filed on Oct. 2, 2013.

(51) Int. Cl.
*H04W 68/02* (2009.01)

(52) U.S. Cl.
CPC ..................................... *H04W 68/02* (2013.01)

(58) Field of Classification Search
None
See application file for complete search history.

(56) References Cited

U.S. PATENT DOCUMENTS

| 2010/0220680 | A1* | 9/2010 | Ramankutty et al. | 370/329 |
|---|---|---|---|---|
| 2010/0278108 | A1* | 11/2010 | Cho et al. | 370/328 |
| 2011/0075675 | A1* | 3/2011 | Koodli et al. | 370/401 |
| 2011/0235605 | A1* | 9/2011 | Yeoum et al. | 370/329 |
| 2011/0286465 | A1* | 11/2011 | Koodli et al. | 370/401 |
| 2011/0310804 | A1* | 12/2011 | Beygzadeh | 370/328 |
| 2012/0057496 | A1* | 3/2012 | Jin et al. | 370/252 |
| 2012/0063464 | A1* | 3/2012 | Mehta | 370/401 |
| 2012/0087313 | A1* | 4/2012 | Yin et al. | 370/328 |
| 2012/0093086 | A1* | 4/2012 | Yin et al. | 370/328 |
| 2012/0110197 | A1* | 5/2012 | Miklos et al. | 709/228 |
| 2012/0264443 | A1* | 10/2012 | Ng et al. | 455/450 |
| 2012/0270574 | A1* | 10/2012 | Nishida et al. | 455/458 |
| 2012/0307687 | A1* | 12/2012 | Zhang et al. | 370/259 |
| 2013/0012243 | A1* | 1/2013 | Nishida et al. | 455/458 |
| 2013/0115979 | A1* | 5/2013 | Zhu et al. | 455/458 |
| 2013/0142120 | A1* | 6/2013 | Nishida et al. | 370/328 |
| 2014/0066082 | A1* | 3/2014 | Anchan et al. | 455/452.1 |

* cited by examiner

*Primary Examiner* — Hassan Phillips
*Assistant Examiner* — Gautam Sharma

(57) ABSTRACT

A system may include a first network device, configured to establish first and second channels with a user device, the first and second channels being channels of a network layer of an Open Systems Interconnect ("OSI") model, receive traffic associated with the user device, and output the traffic via one of the first channel or the second channel. The system may also include a second network device, configured to receive the traffic outputted by the first network device, identify via which channel, of the first and second channels, the traffic was outputted, determine a paging scheme associated with the identified channel, generate a downlink data notification ("DDN") request, the DDN request indicating the determined paging scheme, and output the DDN request to a third network device, wherein the third network device performs paging, based on the determined paging scheme, to locate the user device.

19 Claims, 9 Drawing Sheets

OPTIMIZING PAGING BASED ON SERVICES

CROSS-REFERENCE TO RELATED APPLICATION

This application claims the benefit of U.S. Provisional Patent Application No. 61/885,869, titled "Optimizing Paging Based on Services," filed on Oct. 2, 2013, which is herein incorporated by reference in its entirety.

BACKGROUND

Networks, such as wireless telecommunications networks, may provide services to users, such as voice call services, video call services, short messaging service ("SMS") message services, and/or other services. Some networks implement a "paging" methodology, whereby when a service is to be provided to a user device, such as an incoming telephone call for the user device, the network will attempt to locate the user device. For instance, paging the user device may include determining at which base station, associated with the network, the user device is presently attached.

BRIEF DESCRIPTION OF THE DRAWINGS

FIGS. 5-7 illustrate example processes for performing paging based on traffic type, in accordance with some implementations;

DETAILED DESCRIPTION OF PREFERRED EMBODIMENTS

The following detailed description refers to the accompanying drawings. The same reference numbers in different drawings may identify the same or similar elements.

When traffic is to be sent to a user device (e.g., a wireless telephone), a network may page one or more base stations, in order to determine to which base station the user device is attached. In some circumstances, paging may be used to locate a user device when the user device has moved from one base station to another, and/or when the user device has gone into an "idle" mode. Various different schemes may be used to page base stations, with some schemes being more aggressive than others. Aggressive paging schemes may provide a relatively high level of service (e.g., the base station, to which the user device is attached, may be found relatively quickly). However, these aggressive paging schemes may be relatively costly (e.g., a relatively large amount of resources may be consumed when paging according to aggressive schemes). On the other hand, less aggressive paging schemes may provide a relatively lower level of service, but may be less costly.

Thus, it may be advantageous to use aggressive paging schemes in some situations, while using less aggressive paging schemes in other situations. For example, a network provider may desire to use an aggressive paging scheme for real time services, such as voice services. This may ensure that telephone calls are connected quickly, and may reduce the likelihood that calls will be missed. Furthermore, voice calls may be a lucrative source of income for network providers, therefore increasing the motivation for providing a high level of service for voice calls.

On the other hand, a network provider may desire to use a less aggressive paging scheme for non-real time services, such as short message service ("SMS") messages, as such non-real time services may be viewed as less time-sensitive. Furthermore, smart devices, such as smart phones, may tend to be more "chatty," in that multiple applications may be running on a smart device most of the time, thus increasing the likelihood that the user device's location is known to the network. Since the likelihood that the user device's location is known to the network, a less aggressive paging scheme may be as effective in locating the user device as a more aggressive one, but may consume fewer resources to do so.

Figure 1:
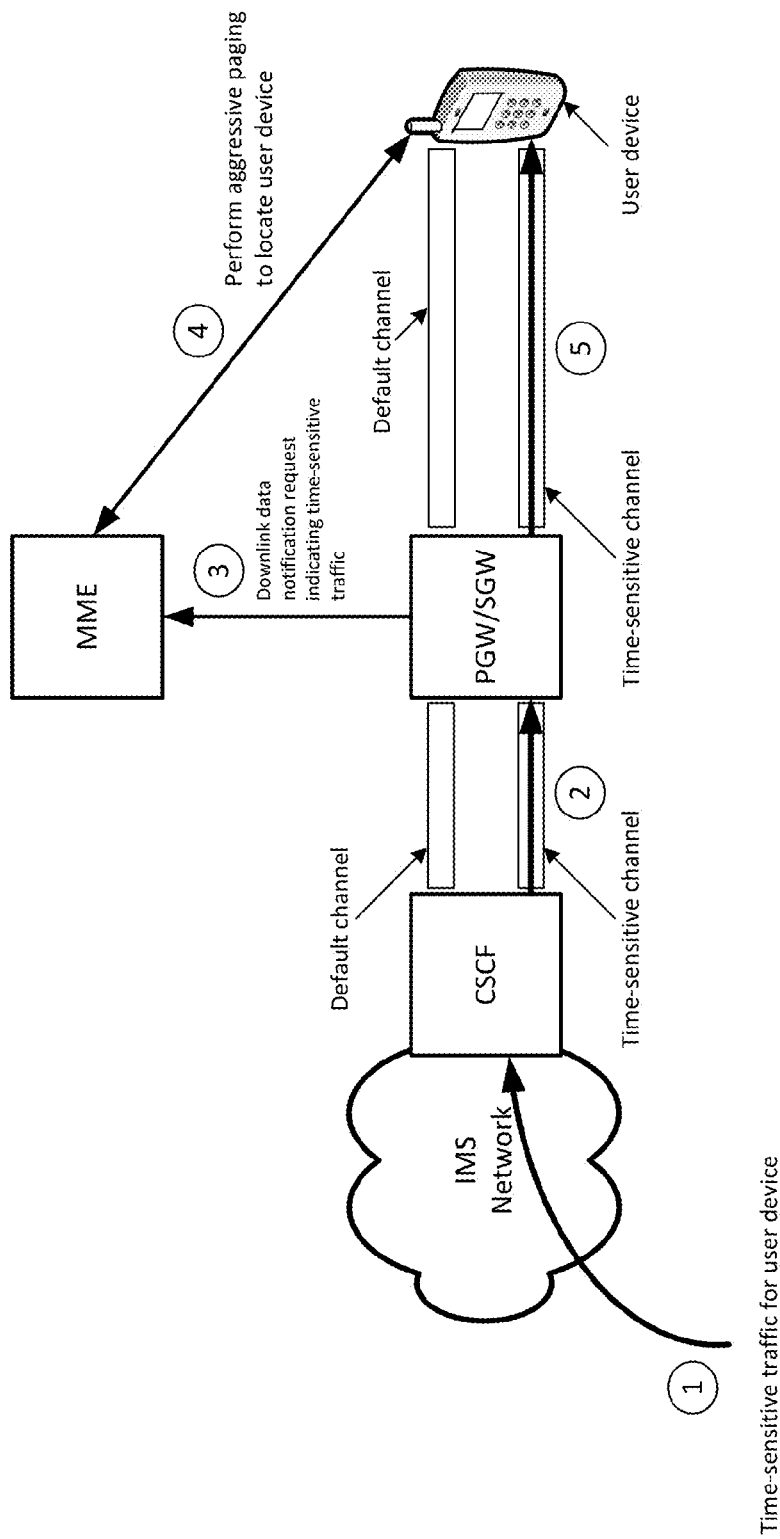
FIG. 1 illustrates an example overview of one or more implementations described herein.

Techniques described herein may allow for a network to perform base station paging based on the type of content associated with a message. FIG. 1 illustrates an overview of one or more example implementations described herein. As shown in FIG. 1, time-sensitive traffic, directed to a particular user device, may be received (denoted by the arrow labeled "1") by a Call Session Control Function ("CSCF") of an Internet Protocol ("IP") Multimedia Subsystem ("IMS") network. The time-sensitive traffic may be, for example, traffic associated with a voice or video call (e.g., signaling that facilitates the setup of the call). The CSCF may establish (or may have previously established) a set of channels with the user device. The illustrated set of channels may correspond to a set of channels at the network layer of the Open Systems Interconnect ("OSI") model. As shown, the set of channels may include a "default" channel, as well as a "time-sensitive" channel. As further shown, these channels may also be established with intermediate network devices, such as a Serving Gateway ("SGW") and/or a packet data network ("PDN") gateway ("PGW") (shown in the figure as "PGW/SGW"), via which traffic flows to and/from the IMS network and the user device.

The CSCF may analyze the traffic, and may identify that the received traffic is time-sensitive traffic. Based on identifying that the traffic is time-sensitive traffic, the CSCF may output the traffic toward the user device, via the established time-sensitive channel (denoted by the arrow labeled "2" in FIG. 1). For instance, the CSCF may output the traffic toward the PGW/SGW, via the time-sensitive channel.

The PGW and/or the SGW may identify that the traffic is time-sensitive traffic, based on the traffic being received via the time-sensitive channel. Before the traffic is forwarded to the user device, the user device may need to be located. In order to locate the user device, the SGW may generate a downlink data notification ("DDN") request, and may output the DDN request to a Mobility Management Entity ("MME"), as denoted by the arrow labeled "3" in FIG. 1. In accordance with some implementations, the DDN request may indicate that the traffic is time-sensitive traffic.

Based on the received DDN request, indicating that the traffic is time-sensitive traffic, the MME may perform a paging operation (denoted by the arrow labeled "4" in FIG. 1). The paging operation may include, for example, sending a message to a group of base stations of a cellular network, in order to identify a base station to which the user device is attached. The aggressiveness of the paging operation may be based on the indication that the traffic is time-sensitive traffic. That is, in some implementations, when the DDN indicates that traffic is time-sensitive traffic, the MME may perform more aggressive paging than when a DDN does not indicate that traffic is time-sensitive traffic.

While described in more detail below, the "aggressiveness" of a paging operation may generally refer to for, instance, a quantity of base stations paged, and/or a rate at which base stations are paged. Once the user device is located via the paging operation, the SGW may output the time-sensitive traffic toward the user device (denoted by the arrow labeled "5" in FIG. 1). By performing paging based on content type, some implementations may provide a high level of service when necessary, and may preserve resources when a high level of service is not as necessary.

Figure 2:
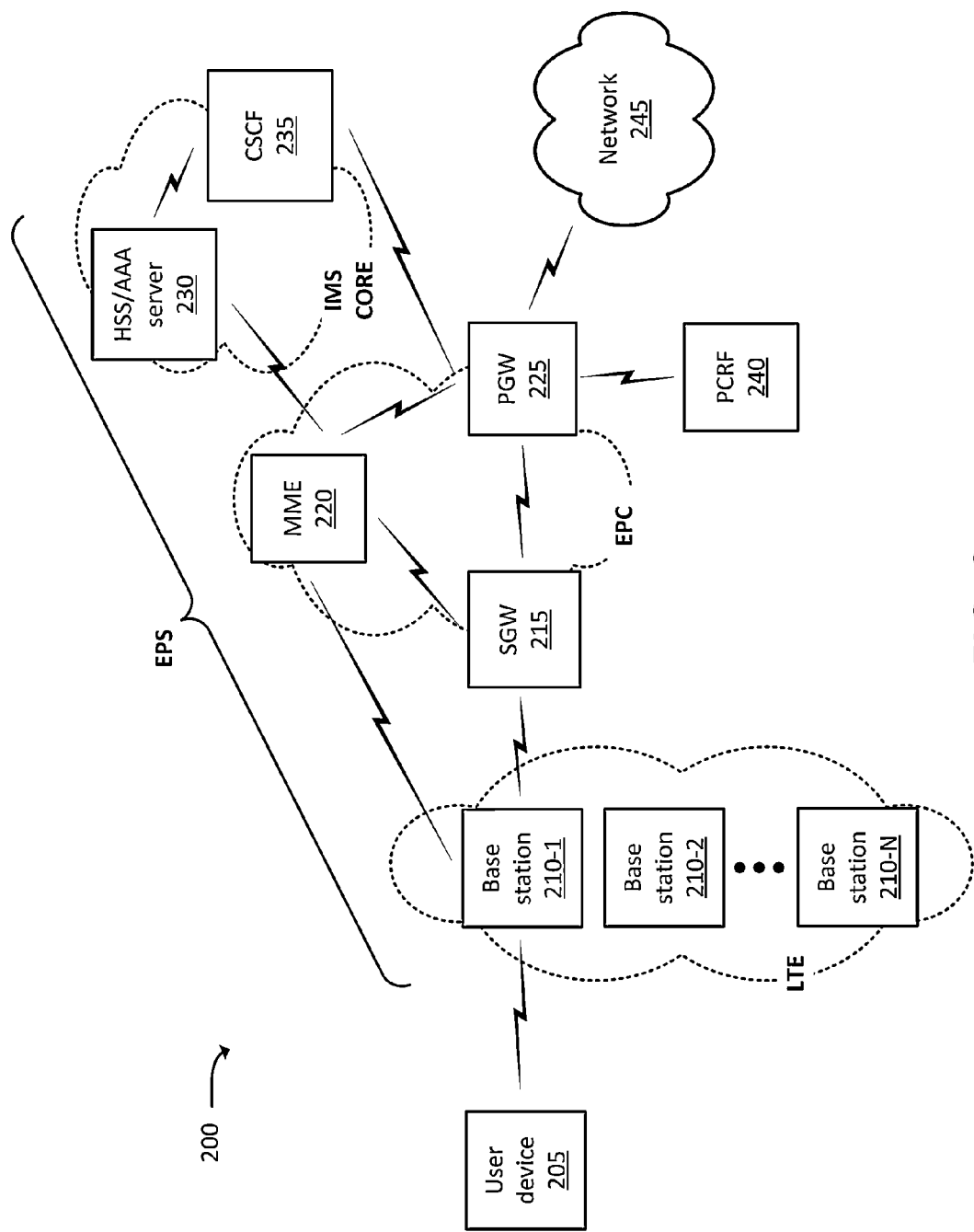
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include user device 205, base stations 210-1 through 210-N (hereinafter sometimes referred to individually as "base station 210," or collectively as "base stations 210," and where N is an integer greater than or equal to 2), SGW 215, mobility management entity ("MME") 220, packet data network ("PDN") gateway ("PGW") 225, home subscriber server/authentication, authorization, and accounting server (hereinafter referred to as "HSS/AAA server") 230, CSCF 235, policy charging and rules function ("PCRF") 240, and network 245.

Environment 200 may include an evolved packet system ("EPS") that includes a Long Term Evolution ("LTE") network, an evolved packet core ("EPC") network, and/or an IMS core network that operate based on a Third Generation Partnership Project ("3GPP") wireless communication standard. The LTE network may be, or may include, a radio access network ("RAN") that includes one or more base stations 210, some or all of which may take the form of an eNodeB ("eNB"), via which user device 205 may communicate with the EPC network. The EPC network may include one or more SGWs 215, MMEs 220, and/or PGWs 225, and may enable user device 205 to communicate with network 245 and/or the IMS core network. The IMS core network may include HSS/AAA server 230, and may manage authentication, session initiation, account information, a user profile, etc., associated with user device 205.

User device 205 may include a computation and communication device, such as a wireless mobile communication device that is capable of communicating with one or more networks (e.g., network 245 and/or the IMS core). For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from network 245 and/or the IMS core network via base station 210, SGW 215, PGW 225, and/or another device.

Base station 210 may include one or more network devices that receive, process, and/or transmit traffic, such as calls, audio, video, text, and/or other data, destined for and/or received from user device 205. In one example, base station 210 may be an eNB device and may be part of the LTE network. Base station 210 may receive traffic from and/or send traffic to network 245 via SGW 215 and PGW 225. Base station 210 may send traffic to and/or receive traffic from user device 205 via an air interface.

In some implementations, at any given time, user device 205 may be attached to a particular base station 210. For example, as shown in FIG. 2, user device 205 may be attached to base station 210-1. When user device 205 is attached to base station 210-1, user device 205 may wirelessly send and/or receive traffic to and/or from base station 210-1. Base stations 210 may respond to paging requests (e.g., paging requests sent by MME 220), in order to aid MME 220 in identifying to which base station 210 the user device is attached. For instance, assume that MME 220 sends a paging request to base stations 210-1 and 210-2, requesting information regarding an attachment status of user device 205. Base station 210-1 may respond by indicating that user device 205 is attached to base station 210-1, and base station 210-2 may respond by indicating that user device 205 is not attached to base station 210-2 (or may forgo responding to the paging request).

SGW 215 may include one or more network devices that gather, process, store, and/or provide information. For example, SGW 215 may include a gateway, a router, a modem, a switch, a firewall, a network interface card ("NIC"), a hub, a bridge, a proxy server, and/or some other type of device that processes and/or transfers traffic. SGW 215 may, for example, aggregate traffic received from one or more base stations 210 and may send the aggregated traffic to network 245 and/or the IMS core network via PGW 225. In some implementations, SGW 215 may aggregate traffic received from one or more networks (e.g., network 245, the IMS core network, and/or another network), and may send the aggregated traffic to user device 205 via base station 210.

In some implementations, as described below, SGW 215 may receive traffic that is being sent to user device 205. As described below, SGW 215 may identify, based on a channel via which the traffic was received, whether the traffic is time-sensitive traffic. Based on determining whether the traffic is time-sensitive traffic, SGW 215 may determine whether MME 220 should use an aggressive paging scheme to locate user device 205 (e.g., to which base station 210 user device 205 is attached). SGW 215 may generate a DDN request, which may indicate whether an aggressive paging scheme should be used. SGW 215 may output the DDN request to MME 220, which may use the paging scheme to locate user device 205. SGW 215 may receive information from MME 220 once MME 220 has located user device 205. This information may indicate a particular base station 205, to which SGW 215 should forward the traffic, and/or an LTE bearer via which SGW 215 should forward the traffic.

MME 220 may include one or more computation and communication devices that gather, process, search, store, and/or provide information. For example, MME 220 may perform operations to register user device 205 with the EPS, to establish bearer channels associated with a session with user device 205, to hand off user device 205 from the EPS to another network, to hand off user device 205 from the other network to the EPS, and/or to perform other operations. MME 220 may perform policing operations on traffic destined for and/or received from user device 205. As discussed above, MME 220 may, in some implementations, perform base station paging operations, in order to locate user device 205. For instance, MME 220 may receive a DDN request from SGW 215, which may indicate whether traffic is time-sensitive, and/or may indicate a paging scheme to use. MME 220 may locate user device 205 based on this indication (e.g., may select and/or use a paging scheme, based on the indication), and may output information identifying the relevant base station 210 to SGW 215.

PGW 225 may include one or more network devices, or other types of computation and communication devices, that gather, process, search, store, and/or provide information in a manner described herein. For example, PGW 225 may include a gateway, a router, a modem, a switch, a firewall, a NIC, a hub, a bridge, a proxy server, an optical add-drop multiplexer ("OADM"), and/or some other type of device that processes and/or transfers traffic. PGW 225 may aggregate traffic received from one or more SGWs 225, and may send the aggregated traffic to network 245. PGW 225 may also, or alternatively, receive traffic from network 245 and/or the IMS core and may send the traffic toward user device 205 via SGW 215, and/or base station 210.

HSS/AAA server 230 may include one or more server devices, or other types of devices, that gather, process, search, store, and/or provide information. For example, HSS/AAA server 230 may manage, update, and/or store, in a memory associated with HSS/AAA server 230, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with, for example, user device 205. Additionally, or alternatively, HSS/AAA server 230 may perform authentication, authorization, and/or accounting operations associated with the subscriber and/or a communication session with user device 205.

CSCF 235 may include one or more server devices, that perform control signaling for the IMS core network. While shown as a single block in FIG. 2, CSCF 235 may represent functionality associated with multiple components, such as a proxy-CSCF ("P-CSCF"), a serving-CSCF ("S-CSCF"), and/or an interrogating-CSCF ("I-CSCF"). The S-CSCF may maintain correlations between user device 205 IP addresses and SIP addresses, determine application servers to which traffic should be forwarded, provide routing services, and/or perform other functions. The I-CSCF may serve as a forwarding point for outside traffic to the IMS core network and/or to the S-CSCF, and may have a published IP address (e.g., the IP address may be registered with a Domain Name System ("DNS") server).

The P-CSCF may serve as a Session Initiation Protocol ("SIP") proxy that may aid in the initial registration of user device 205 with the IMS core network, may establish IP Security ("IPSec") channels and security associations ("SAs") with user device 205, and may inspect some or all signaling that is performed with respect to the IMS core network. In some implementations, the P-CSCF may inspect outbound traffic (e.g., signaling traffic) that is directed towards user device 205, and may determine whether the traffic is time-sensitive. Based on whether the traffic is time-sensitive, the P-CSCF may choose a particular channel (e.g., a particular IPSec channel) via which the traffic should be forwarded to user device 205. In some implementations, the traffic sent from the P-CSCF to user device 205 may be signaling traffic associated with IMS services. For instance, the signaling traffic may include parameters for a voice or video call, call notifications (e.g., "rings"), presence information, message notifications, and/or other types of signaling.

PCRF 240 may include one or more server devices, or other types of devices, that aggregate information sent to and received from the EPC network and/or other sources. PCRF 240 may receive information regarding policies and/or subscriptions from one or more sources, such as subscriber databases and/or from one or more users (such as, for example, an administrator associated with PCRF 240), and may output policy information to one or more devices that enforce the policies, such as PGW 225.

Network 245 may include one or more wired and/or wireless networks. For example, network 245 may include a wide area network ("WAN"), a metropolitan area network ("MAN"), a telephone network (e.g., the Public Switched Telephone Network ("PSTN")), an ad hoc network, an intranet, a PDN (e.g., the Internet), a fiber optic-based network, and/or a combination of these or other types of networks. In some implementations, network 245 may include a private enterprise network, and/or a private portion of a provider's back-end network.

Figure 3A:
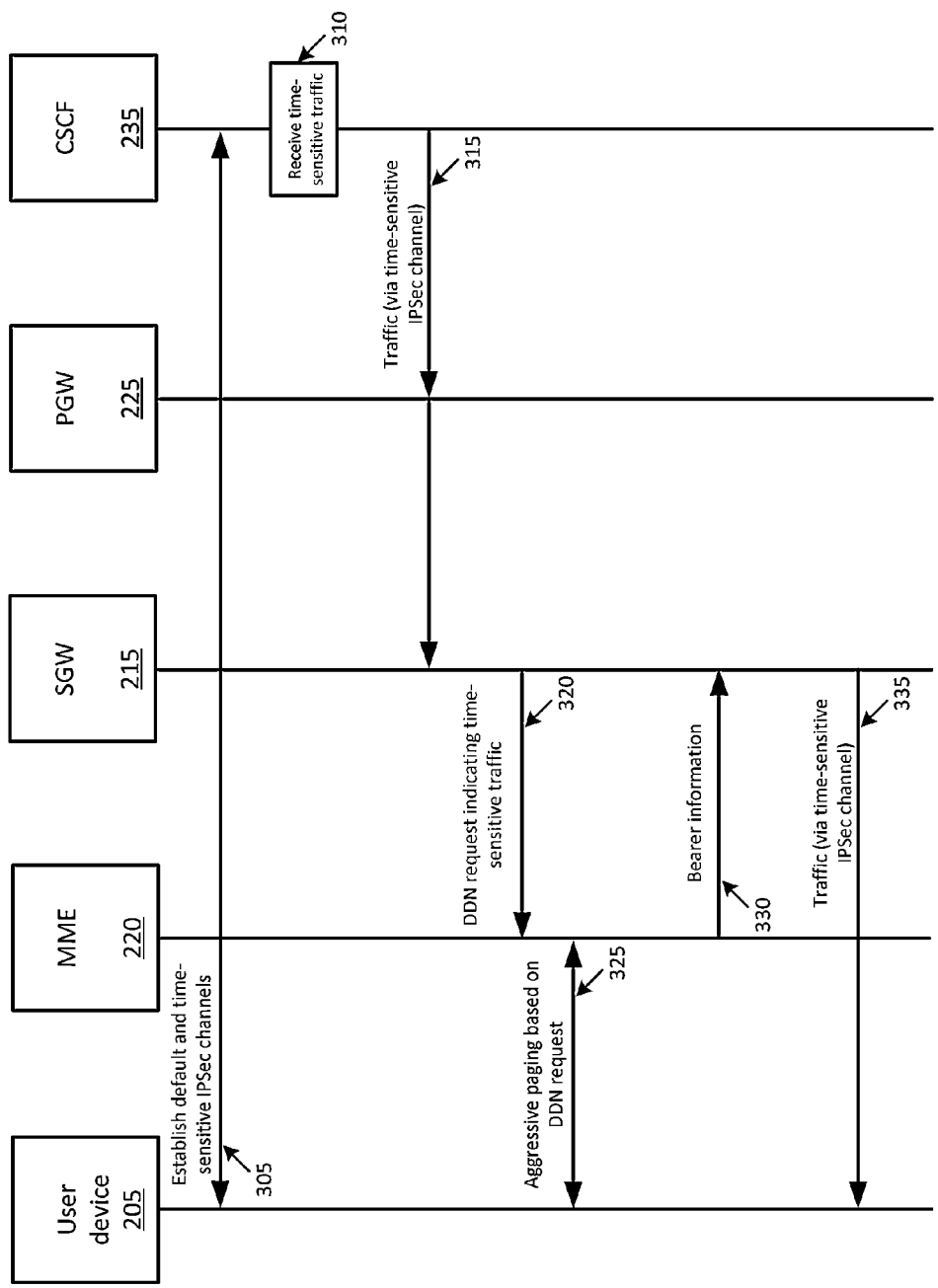
FIGS. 3A and 3B illustrate example signal flows for performing paging based on traffic type, in accordance with some implementations described herein.
Figure 3B:
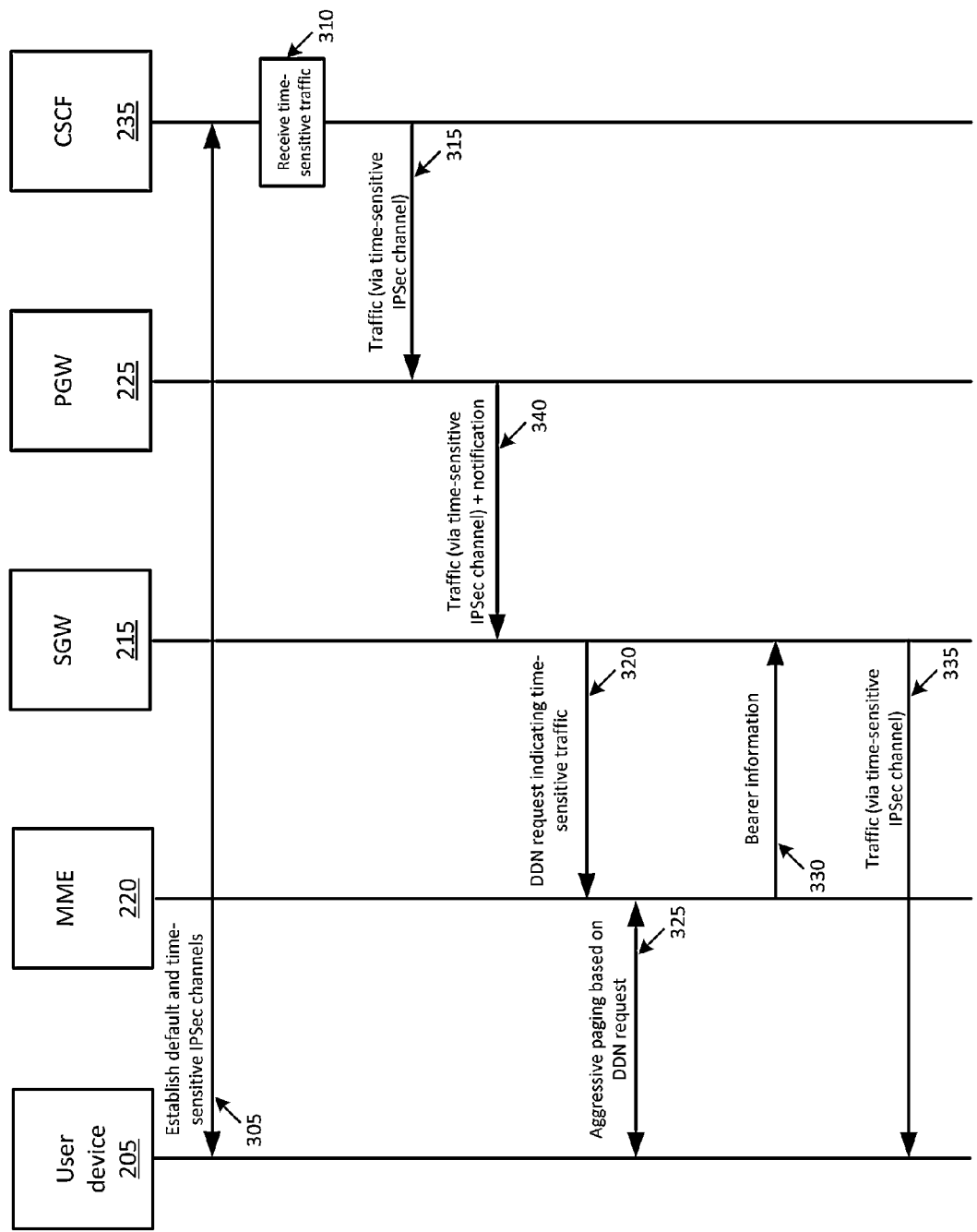

FIGS. 3A and 3B illustrate an example signal flow for performing paging based on traffic type. As shown in FIG. 3A, user device 205 may establish (at 305) a set of channels with CSCF 235. In some implementations, the set of channels may traverse devices in a network path between user device 205 and CSCF 235, such as SGW 215 and PGW 225. The set of channels may include multiple channels at the network layer of the OSI model, such as IPSec channels. The channels may include, for example, a set of "default" channels and a set of "time-sensitive channels."

Figure 4A:
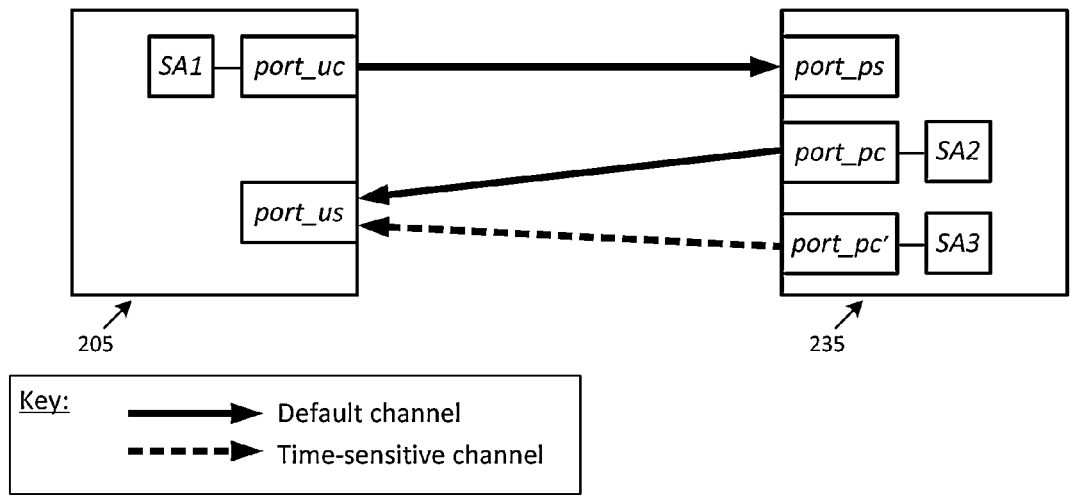
FIGS. 4A and 4B illustrate example channels, and their respective security associations ("SAs"), that may be established, in accordance with some implementations.
Figure 4B:
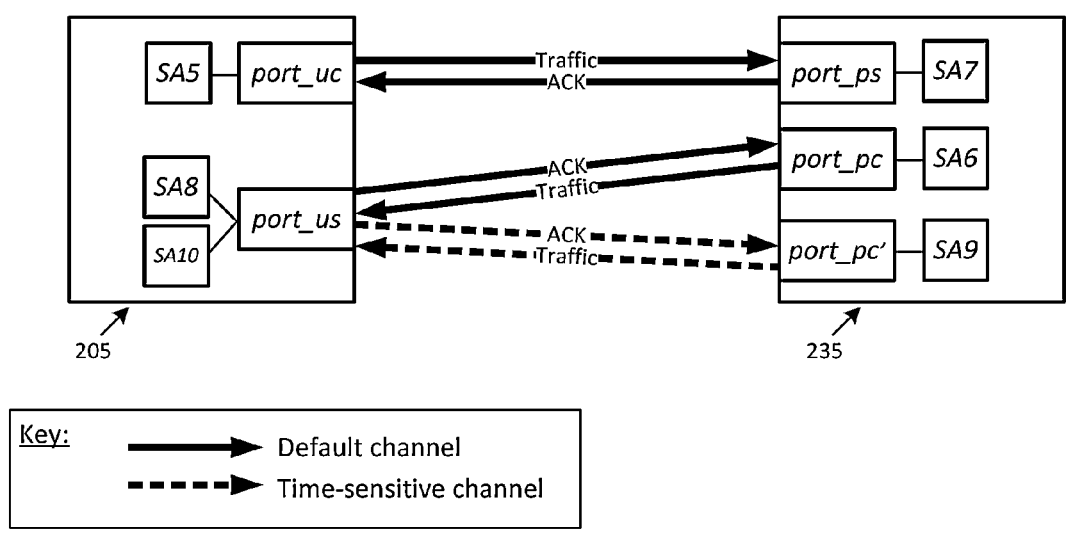

FIGS. 4A and 4B illustrate an example of the network layer channels that may be established (at 305). In some implementations, different sets of network layer channels may be established, based on a transport layer protocol used for communications between user device 205 and CSCF 235. For instance, FIG. 4A illustrates a set of network layer channels that may be established when User Datagram Protocol ("UDP") is used in the transport layer, while FIG. 4B illustrates a set of network layer channels that may be established when Transmission Control Protocol ("TCP") is used in the transport layer.

As shown in FIG. 4A, a set of default channels (e.g., two default channels, as indicated by the solid arrows), may be established between user device 205 and CSCF 235. Additionally, a time-sensitive channel (as indicated by the dashed arrow in FIG. 4A) may be established between user device 205 and CSCF 235. In some implementations, one or more of the channels shown in FIG. 4A may be network layer channels, such as IPSec channels. As shown, one default channel may be established between a "client" port of user device 205 (port_uc) and a "server" port of CSCF 235 (port_ps). Additionally, a default channel may be established between a "server" port of user device 205 (port_us) and a "client" port of CSCF 235 (port_pc). As further shown, a time-sensitive channel may be established between the "server" port of user device 205 (port_us) and another "client" port of CSCF 235 (port_pc'). As indicated by the arrows in the figure, a "server" port may refer to a port that receives traffic, while a "client" port may refer to a port that outputs traffic. In some implementations, a "server" port may additionally, or alternatively, output traffic, and a "client" port may additionally, or alternatively, receive traffic. In some implementations, port_ps, port_pc, and/or port_pc' may be ports associated with a P-CSCF portion of CSCF 235.

In some implementations, user device 205 and CSCF 235 may each maintain a set of SAs, in order to establish and maintain the channels. The SAs may include, for example, security information, a destination address (e.g., an IP address and/or a port number of a corresponding "server" port), and/or other information. As shown, user device 205 may maintain an SA ("SA1") for the channel between port_uc and port_ps. Further, CSCF 235 may maintain an SA ("SA2") for the channel between port_pc and port_us, and may maintain another SA ("SA3") for the channel between port_pc' and port_us. Thus, SA3 may be used to facilitate the establishment and/or the maintenance of the time-sensitive channel between user device 205 and CSCF 235.

As shown in FIG. 4B, a set of default channels (e.g., four default channels, as indicated by the solid arrows), may be established between user device 205 and CSCF 235. Additionally, a set of time-sensitive channels (as indicated by the dashed arrows in FIG. 4B) may be established between user device 205 and CSCF 235. The established channels may be used by user device 205 and CSCF 235 to communicate traffic, as well as acknowledgments and/or other signaling. For example, one of the illustrated default channels between port_uc and port_ps may be used to output traffic from user device 205 to CSCF 235 (denoted by the label "traffic" on the arrow from port_uc to port_ps), and the other one of the channels between port_uc and port_ps may be used to output acknowledgement messages from CSCF 235 to user device 205 (denoted by the label "ACK" on the arrow from port_ps to port_uc).

Similar to the discussion above with respect to FIG. 4A, user device 205 and CSCF 235 may each maintain a set of SAs, in order to establish and maintain the data channels. As shown, user device 205 may maintain an SA ("SA5") for the "Traffic" channel between port_uc and port_ps, and CSCF 235 may maintain an SA ("SA7") for the "ACK" channel between port_ps and port_uc. As also shown, user device 205 may maintain an SA ("SA8") for the "ACK" channel between port_us and port_pc, and CSCF 235 may maintain an SA ("SA6") for the "Traffic" channel between port_pc and port_us. Furthermore, user device 205 may maintain an SA ("SA10") for the "ACK" channel between port_us and port_pc', and CSCF 235 may maintain an SA ("SA9") for the "Traffic" channel between port_pc' and port_us. Thus, SA9 and SA10 may be used to facilitate the establishment and/or the maintenance of the time-sensitive channels between user device 205 and CSCF 235.

Returning to FIG. 3A, CSCF 235 may receive (at 310) traffic for user device 205. The traffic may be, for instance, traffic associated with one or more services provided by the IMS core network, such as voice calling, video calling, buffered or live audio and/or video streaming, real-time gaming, IMS signaling, a TCP-based service (e.g., web browsing, chat, etc.), presence information, and/or another service. For example, the traffic may be signaling information (e.g., Session Initiation Protocol ("SIP") messages) that aid in the establishment or operation of the services provided by the IMS core network. CSCF 235 may receive the traffic from, for example, an application server associated with the IMS core network.

CSCF 235 may analyze the traffic to determine whether the traffic is time-sensitive traffic. For instance, CSCF 235 may analyze header and/or payload information associated with the traffic in order to determine the type of traffic, and/or a service with which the traffic is associated. In some implementations, CSCF 235 may otherwise receive a notification or an indication regarding the type of traffic and/or the type of service with which the traffic is associated.

Assume, for instance, that the traffic (received at 310) is voice call traffic. CSCF 235 may store or receive information indicating that voice call traffic is to be considered "time-sensitive" traffic. Therefore, CSCF 235 may identify that the traffic (received at 310) is time-sensitive traffic. CSCF 235 may forward (at 315) the time-sensitive traffic toward user device 205. For instance, CSCF 315 may output the time-sensitive traffic to PGW 225, which may forward the time-sensitive traffic to SGW 215. In some implementations, based on identifying that the traffic is time-sensitive traffic, CSCF 235 may output the traffic to PGW 225 via the time-sensitive channel (established at 305), and PGW 225 may forward the traffic to SGW 215 via the time-sensitive channel.

SGW 215 may analyze the traffic to determine that the traffic has been sent via the time-sensitive network layer channel. For example, SGW 215 may identify that a port of CSCF 235, from which the traffic was sent, is a port that is associated with the time-sensitive network layer channel. In some implementations, SGW 215 may be configured by an administrator to maintain information identifying one or more ports of CSCF 235 that are associated with time-sensitive channels (and/or information identifying one or more ports of CSCF 235 that are not associated with time-sensitive channels). In some implementations, when CSCF 235 and user device 205 establish (at 305) the channels, CSCF 235 may signal SGW 215 with information indicating one or more ports that are associated with time-sensitive channels.

Based on determining that traffic has been received via the time-sensitive channel, SGW 215 may determine that the traffic is time-sensitive traffic. In other situations, when SGW 215 receives traffic via the default channel, SGW 215 may determine that the traffic is not time-sensitive traffic. Returning to the example in FIG. 3A, based on determining that the traffic is time-sensitive traffic, SGW 215 may generate a DDN request, so that user device 205 can be located. The generated DDN request may include an indication that the traffic is time-sensitive traffic. In some implementations, the DDN request may additionally, or alternatively, indicate a paging scheme that should be used to locate user device 205. SGW 215 may output (at 320) the DDN request (which indicates that the traffic is time-sensitive traffic, and/or indicates a paging scheme to use) to MME 220.

MME 220 may perform paging (at 325) based on the DDN request. In this example, since the traffic is time-sensitive traffic, the DDN request may indicate that an "aggressive" paging scheme should be used. In another situation, if a DDN request does not indicate that traffic is time-sensitive, MME 220 may perform paging using a less aggressive paging scheme. For example, the more aggressive paging scheme may cause MME 220 to send paging requests to a greater quantity of base stations 210 than would be sent using the less aggressive paging scheme.

One example of a relatively non-aggressive paging scheme includes a "last known base station" paging technique, in which MME 220 pages the last known base station 210, to which user device 205 was attached. An example of a paging scheme that may be relatively more aggressive than the "last known base station" paging technique may be a "last known tracking area" paging technique. In this technique, MME 220 may page the last known base station 210, as well as base stations 210 in a pre-defined group (e.g., a "tracking area") with the last known base station 210. An example of a paging scheme that may be relatively more aggressive than the "last known tracking area" paging technique may be an "enlarged last known tracking area" paging technique, in which MME 220 may page the base stations 210 of the last known tracking area, as well as other base stations 210 within a particular distance of the last known tracking area. An example of a paging scheme that may, in some instances, be relatively more aggressive than the "enlarged last known tracking area" paging technique may be a "last known and neighboring tracking areas" paging technique, in which MME 220 may page the base stations 210 of the last known tracking area, as well as the base stations 210 in tracking areas that are within a particular distance of the last known tracking area. An example of a paging scheme that may be relatively more aggressive than the "last known and neighboring tracking areas" paging technique may be an "all base stations" paging technique, in which MME 220 may page all base stations 210 with which MME 220 is able to communicate.

Using the indicated paging scheme (at 325), MME 220 may locate user device 205, and may output (at 330) bearer information to SGW 215. The bearer information may indicate, for example, a channel at the link layer of the OSI model, which may be used by SGW 215 in order to forward (at 335) the traffic to user device 205.

FIG. 3B illustrates a similar signal flow as is shown in FIG. 3A. Similar signals in FIG. 3B are numbered with the same reference numerals and, for the sake of conciseness, are not described again below. The signal flow shown in FIG. 3B may correspond to an implementation in which PGW 225 determines that traffic, received from CSCF 235, is time-sensitive traffic. In contrast, the signal flow shown in FIG. 3A may correspond to an implementation in which SGW 215 determines that traffic, received from CSCF 235, is time-sensitive traffic.

As shown in FIG. 3B, PGW 225 may receive time-sensitive traffic from CSCF 235. PGW 225 may determine that the traffic is time-sensitive traffic, based on receiving the traffic via the time-sensitive network layer channel. PGW 225 may output (at 340) the time-sensitive traffic to SGW 215, as well as a notification, indicating that the traffic is time-sensitive traffic. For instance, PGW 225 may output additional signaling, and/or may modify the traffic (e.g., may modify header information in the traffic) to indicate that the traffic is time-sensitive traffic. SGW 215 may receive the traffic and the notification (sent at 340), and may generate the DDN request for MME 220 in a manner similar to that discussed above with respect to FIG. 3A.

Figure 5:
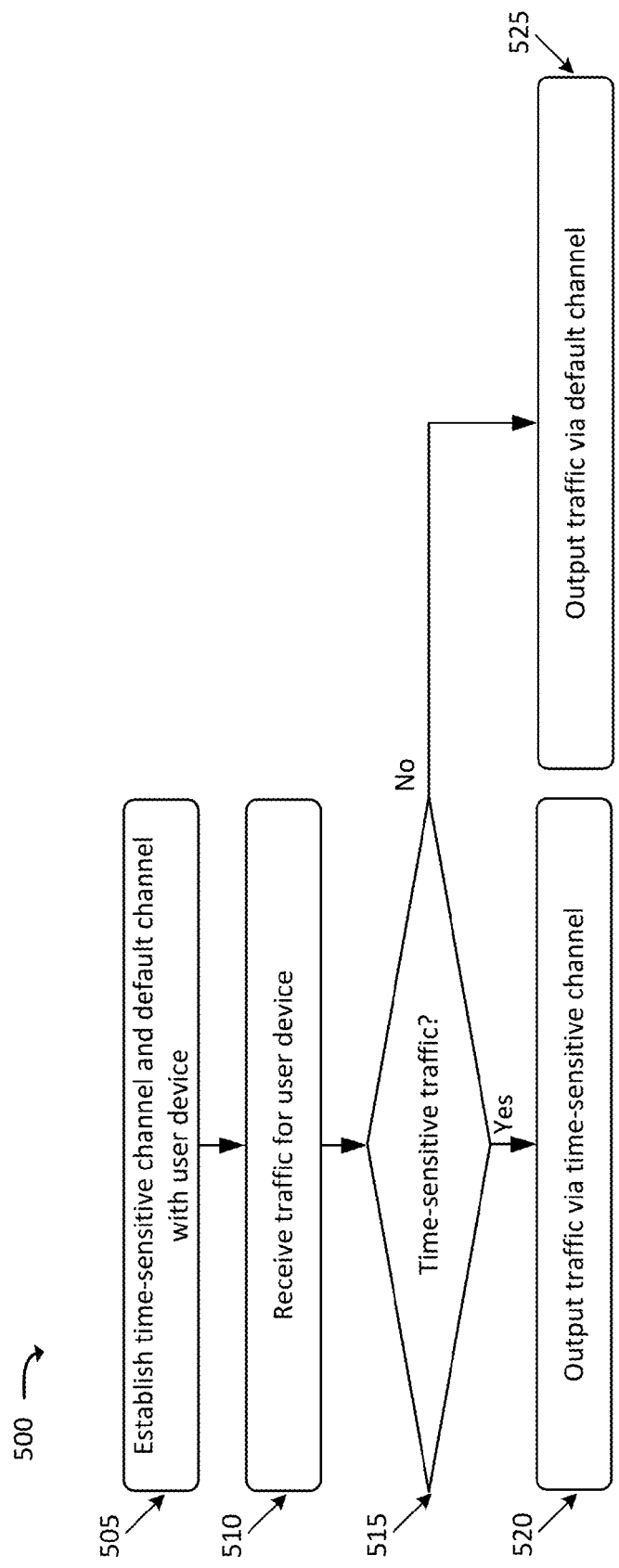

FIGS. 5-7 illustrate example processes 500, 600, and 700 (referred to herein as "processes 500-700") for performing paging based on traffic type. In some implementations, process 500 may be performed by CSCF 235, process 600 may be performed by SGW 215 and/or PGW 225, and process 700 may be performed by MME 220. In other implementations, one or more of processes 500-700 may be performed by one or more devices in addition to, or in lieu of, the devices mentioned above.

As shown in FIG. 5, process 500 may include establishing a time sensitive channel and a default channel with a user device (block 505). For example, as described above, CSCF 235 may establish a set of network layer channels, such as IPSec channels. In a scenario where CSCF 235 and user device 205 communicate via UDP, three total application layer channels may be established between CSCF 235 and user device 205 (e.g., two default channels and one time-sensitive channel). In a scenario where CSCF 235 and user device 205 communicate via TCP, six total application layer channels may be established between CSCF 235 and user device 205 (e.g., four default channels and two time-sensitive channels). In other implementations, different quantities of application layer channels may be established (e.g., more channels or fewer channels).

As also mentioned above, establishing the channels (at block 505) may include maintaining a set of SAs at user device 205 and a set of SAs at CSCF 235. The SAs may be created as part of a registration procedure (e.g., an SIP registration procedure), in which user device 205 may authenticate CSCF 235, and CSCF 235 may authenticate user device 205. During this procedure, suitable information may be exchanged between user device 205 and CSCF 235, which may allow user device 205 and CSCF 235 to generate and maintain their respective SAs. As further mentioned above, CSCF 235 may include a P-CSCF. In some implementations, the channels (established at block 505) may be established between the P-CSCF and user device 205.

Process 500 may also include receiving traffic for the user device (block 510). For example, CSCF 235 may receive traffic that indicates that the intended destination is user device 205. The traffic may be traffic associated with one or more services, such as voice calling, video calling, short message service ("SMS") messaging, presence information, e-mail, file transfer, and/or other services provided by an IMS core network.

While block 510 is described generally in the context of CSCF 235 receiving traffic for user device 205, in some implementations, a P-CSCF (e.g., a portion of CSCF 235) may receive (at block 510) the traffic for the user device. In some implementations, the P-CSCF may receive the traffic from an S-CSCF (e.g., another portion of CSCF 235) and/or from another source. As mentioned above, the traffic may include control signaling (e.g., a call notification, an e-mail notification, an SMS notification, etc.).

Process 500 may further include determining whether the traffic is time-sensitive traffic (block 515). For example, CSCF 235 may analyze the traffic (e.g., header and or payload information associated with the traffic) to determine the type of traffic, and/or the type of service with which the traffic is associated. CSCF 235 may, in some implementations, maintain information that indicates types of traffic (and/or types of services) that are considered to be "time-sensitive" traffic. Additionally, or alternatively, CSCF 235 may maintain information that indicates types of traffic (and/or types of services) that are not considered to be "time-sensitive" traffic.

For instance, an administrator may provide configuration information that correlates traffic types (and/or types of services) to indications of whether the traffic types (and/or types of services) are to be considered "time-sensitive." In some implementations, CSCF 235 may receive such configuration information from a source in addition to, or in lieu of, an administrator (such as from a device that automatically and/or dynamically generates or modifies the configuration information). In some implementations, one example of a type of traffic that may be considered "time-sensitive" may be voice call traffic (e.g., signaling associated with a voice call service), while one example of a type of traffic that may be considered not "time-sensitive" may be SMS messaging traffic (e.g., signaling associated with an SMS messaging service).

If CSCF 235 determines that the traffic is time-sensitive traffic (block 515—YES), then process 500 may include outputting the traffic via the time-sensitive network layer channel (block 520). For example, as described above with respect to FIG. 5A, CSCF 235 may forward the traffic toward user device 205 (e.g., may output the traffic to PGW 225). If, on the other hand, CSCF 235 determines that the traffic is not time-sensitive traffic (block 515—NO), then process 500 may include outputting the traffic via the default network layer channel (block 525).

Referring to FIG. 6, process 600 may include receiving traffic from a CSCF (block 605). For example, SGW 215 may receive (via, for example, PGW 225) traffic outputted by CSCF 235 (e.g., a P-CSCF portion of CSCF 235).

Process 600 may also include determining whether the traffic was received via a time-sensitive channel (block 610).

For instance, prior to the performance of block 605, a default channel and a time-sensitive network layer channel may have been established between user device 205 and CSCF 235. As discussed above, SGW 215 may also maintain information that may be used to identify traffic that has been sent via a time-sensitive network layer channel (e.g., information identifying one or more ports of CSCF 235).

If the traffic has been received via a time-sensitive channel (block 610—YES), then process 600 may include setting a paging parameter to "aggressive." For example, the "aggressive" paging parameter may indicate that the received traffic is time-sensitive traffic, and/or may indicate a paging scheme that should be used to locate user device 205. If, on the other hand, the traffic has been received via a time-sensitive channel (block 610—YES), then process 600 may include setting a paging parameter to "default." For example, the "default" paging parameter may indicate that the received traffic is not time-sensitive traffic, and/or may indicate a paging scheme that should be used to locate user device 205, which is less aggressive than the paging scheme indicated by an "aggressive" paging parameter.

Process 600 may also include outputting a DDN request, including the paging parameter, to an MME (block 625). For example, SGW 215 may generate a DDN request, including the paging parameter set at block 615 or 620, and may output the DDN request to MME 220.

While FIG. 6 illustrates an implementation in which SGW 215 determines whether traffic, received from CSCF 235, is time-sensitive traffic, in some implementations, PGW 225 may alternatively, or additionally, determine whether the traffic is time-sensitive traffic. As discussed above with respect to FIG. 5B, for example, PGW 225 may output an indication to SGW 215, indicating whether the traffic is time-sensitive traffic, and SGW 215 may (at block 615 or 620) set a paging parameter based on the indication.

Referring to FIG. 7, process 700 may include receiving a DDN request, including a paging parameter, from an SGW (block 705). For example, MME 220 may receive a DDN request from SGW 215. As mentioned above (e.g., with respect to blocks 615 and 620) the DDN request may include, or be accompanied by, a paging parameter, which may indicate whether traffic to be outputted to user device 205 is time-sensitive, and/or may indicate a paging scheme to be used to locate user device 205.

Process 700 may include paging the user device based on the paging parameter (block 710). For instance, MME 220 may page user device 205 using a paging scheme indicated by the paging parameter. In some implementations, when the paging parameter indicates whether the traffic is time-sensitive (but does not specify a paging scheme to use), MME 220 may determine a paging scheme to use. For instance, MME 220 may maintain information that correlates paging schemes to indications of whether traffic is time-sensitive, and may use this information to a paging scheme based on whether traffic is time-sensitive. As described above with respect to FIG. 3A, once MME 220 locates user device 205, MME 220 may provide bearer information to SGW 215, in order to allow SGW 215 to output the traffic to user device 205.

Figure 8:
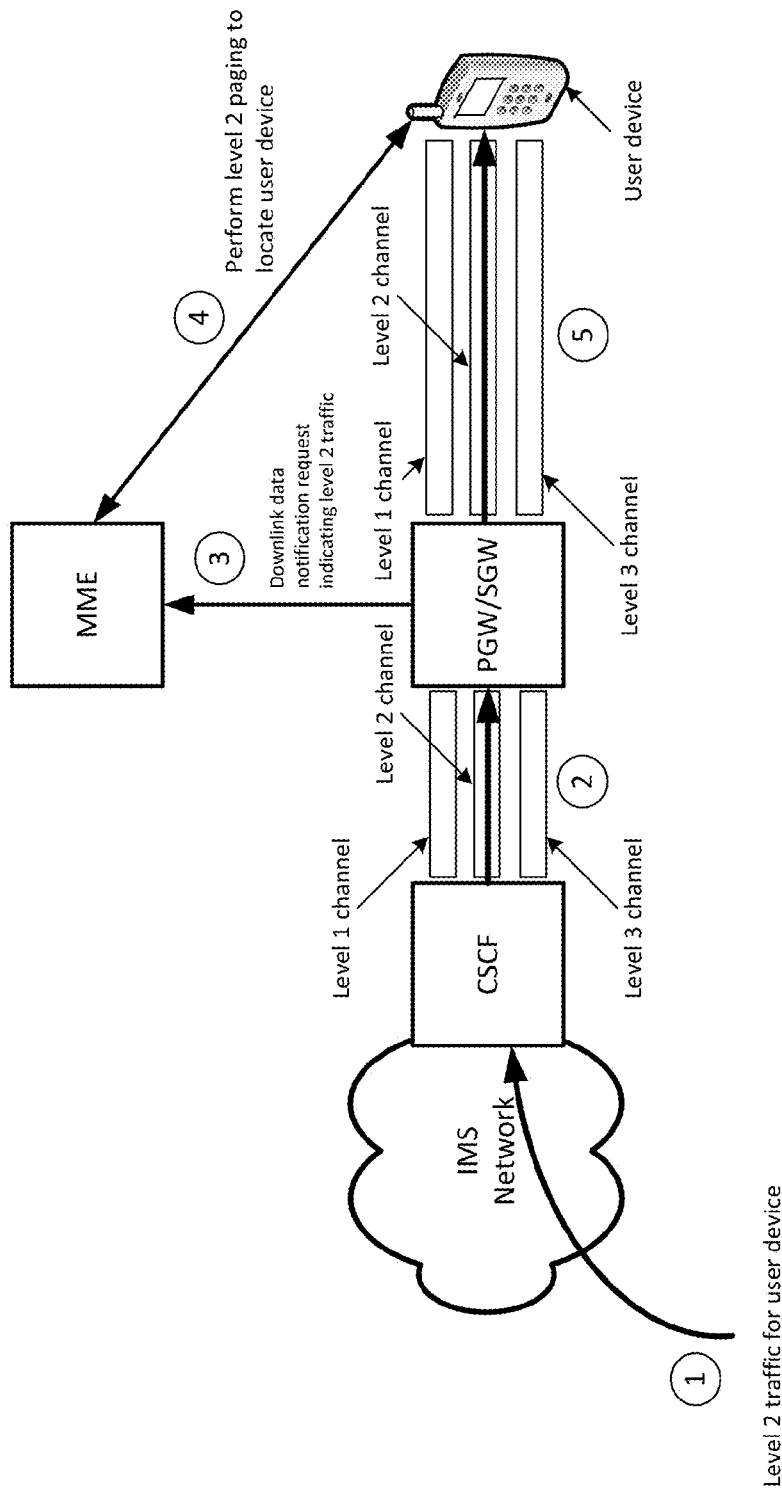
FIG. 8 illustrates an example of different levels of paging that may occur based on traffic type.

While above examples describe implementations in which two levels of time-sensitivity (e.g., "time-sensitive" and "default") may be used to determine how aggressively to page user device 205, other implementations may use more than two levels of time-sensitivity. For example, as shown in FIG. 8, a CSCF may establish three network layer channels (e.g., IPSec channels) with a user device. The different channels may each be associated with different levels of time-sensitivity of traffic. For example, the CSCF may output SMS messaging traffic via the level 1 channel, video call traffic via the level 2 channel, and voice call traffic via the level 3 channel.

Assume, for instance, that the CSCF receives video call traffic for the user device (denoted by the arrow labeled "1"). CSCF may determine that this traffic is "level 2" traffic, and may output the traffic via the level 2 IPSec channel (denoted by the arrow labeled "2"). The PGW and/or the SGW may determine that the traffic was received via the level 2 IPSec channel, and the SGW may generate a DDN request indicating that the traffic is level 2 traffic. Alternatively, or additionally, the SGW may identify a paging scheme associated with level 2 traffic, and may indicate the paging scheme in the DDN request.

The SGW may output the DDN request, as well as the indication of the level of traffic and/or the paging scheme to the MME (denoted by the arrow labeled "3"). The MME may perform the paging indicated in the DDN request. For example, the paging indicated in the DDN request, in this example, may be more aggressive than a paging scheme associated with level 1 traffic, but less aggressive than a paging scheme associated with level 3 traffic. Once the user device has been located by the MME, the SGW may forward the traffic to the user device (denoted by the arrow labeled "5").

Figure 9:
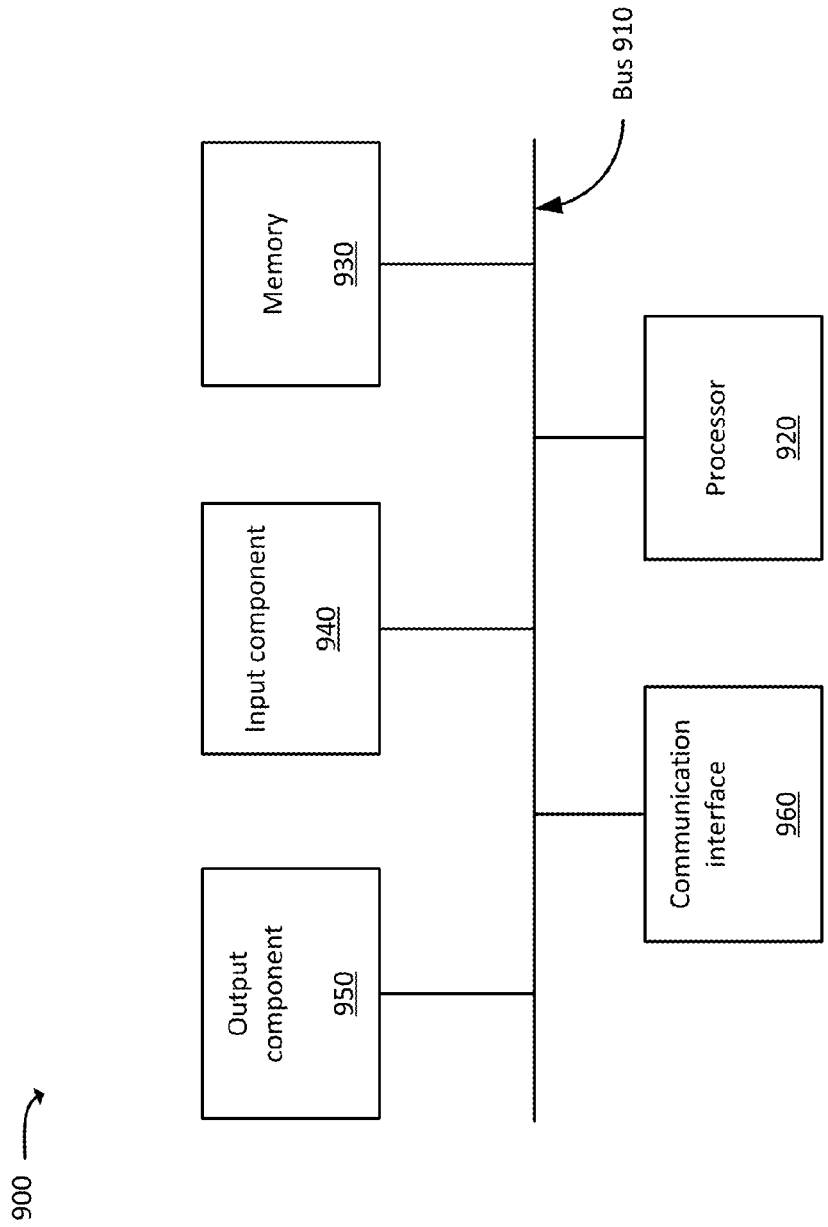
FIG. 9 illustrates example components of a device, which may be used in one or more implementations described herein.

FIG. 9 is a diagram of example components of device 900. One or more of the devices described above (e.g., with respect to FIGS. 1, 2, 3A, 3B, 4A, 4B, and 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signals have been described with regard to FIGS. 3A, 3B, and 5-7, the order of the blocks and/or signals may be modified in other implementations. Further, non-dependent blocks and/or signals may be performed in parallel. Also, additional blocks and/or signals may be present, either before, after, or in between the blocks and/or signals shown in these figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   establishing, by a network device, a first channel and a second channel with a user device, the first and second channels being different channels of a network layer of an Open Systems Interconnect ("OSI") model, the first channel being used to transmit time-sensitive traffic;
   receiving, by the network device, traffic associated with the user device via a third channel or a fourth channel, the third channel being associated with time-sensitive traffic and the fourth channel being associated with less time-sensitive traffic than traffic associated with the third channel;
   determining, by the network device, a type of service associated with the traffic;
   determining, by the network device, based on whether the traffic associated with the user device was received via the third channel or the fourth channel, and based on the type of service associated with the traffic, whether the traffic, associated with the user device, is time-sensitive traffic;
   selecting, by the network device and based on determining whether the traffic is time-sensitive traffic, one of the first channel or the second channel, the selecting including:
      selecting the first channel when the traffic is time-sensitive traffic; and
      outputting, by the network device, the traffic via the selected channel, wherein the outputting causes a paging scheme to be selected based on whether the traffic is time-sensitive traffic, as indicated by whether the selected channel, via which the traffic is outputted, is the first channel or the second channel,
      wherein a first paging scheme, associated with the first channel, is more aggressive than a second paging scheme, associated with the second channel.

2. The method of claim 1, wherein the network device includes a proxy Call Session Control Function ("P-CSCF") of an Internet Protocol Multimedia System ("IMS") core network.

3. The method of claim 1, wherein the first and second channels are Internet Protocol Security ("IPSec") channels.

4. The method of claim 1, wherein the type of service includes at least one of:
   a voice call service,
   a video call service,
   a buffered audio or video streaming service,
   a live audio or video streaming service,
   a real-time gaming service,
   an Internet Protocol Multimedia System ("IMS") signaling service, or
   a Transmission Control Protocol ("TCP")-based service.

5. The method of claim 1, wherein outputting the traffic includes outputting the traffic to a packet data network gateway ("PGW"),
   wherein the PGW identifies whether the traffic is time-sensitive traffic based on whether the traffic was outputted by the network device via the first channel or via the second channel.

6. The method of claim 1, wherein the traffic includes signaling traffic associated with the type of service.

7. The method of claim 1, wherein the first paging scheme causes a first quantity of base stations to be paged, wherein the second paging scheme causes a second quantity of base stations to be paged, wherein the first quantity is greater than the second quantity.

8. A system, comprising:
   a first network device, configured to:
      establish first and second channels with a user device, the first and second channels being different channels of a network layer of an Open Systems Interconnect ("OSI") model, wherein the first channel is associated with time-sensitive traffic and the second channel is associated with other traffic,
      receive traffic associated with the user device, and
      output the traffic via one of the first channel or the second channel;
   a second network device, configured to:
      receive the traffic outputted by the first network device,
      identify via which channel, of the first and second channels, the traffic was outputted, determine a paging scheme associated with the identified channel, wherein a first paging scheme, associated with the first channel, is more aggressive than a second paging scheme, associated with the second channel, generate a downlink data notification ("DDN") request, the DDN request indicating the determined paging scheme, and output the DDN request to a third network device, wherein the third network device performs paging, based on the determined paging scheme, to locate the user device.

9. The system of claim 8, wherein the first network device includes a Call Session Control Function ("CSCF") of an Internet Protocol Multimedia System ("IMS") core network.

10. The system of claim 8, wherein the second network device includes a serving gateway ("SGW") of a long term evolution ("LTE") network.

11. The system of claim 10, wherein the first paging scheme causes the third network to page a first quantity of base stations, wherein the second paging scheme causes the third network device to page a second quantity of base stations, wherein the first quantity is greater than the second quantity.

12. The system of claim 8, wherein the third network device includes a mobility management entity ("MME") of a long term evolution ("LTE") network.

13. The system of claim 8, wherein the first and second channels are Internet Protocol Security ("IPSec") channels.

14. The system of claim 8, wherein the second network device is further configured to:

store information identifying a first port, of the first network device, that is associated with the first channel, store information identifying a second port, of the first network device, that is associated with the second channel, wherein when identifying via which channel, of the first and second channels, the traffic was outputted, the second network device is to:

analyze the traffic to identify a source port associated with the traffic, and determine whether the source port matches the first port or the second port.

15. A method, comprising:

receiving, by a first network device, traffic associated with a user device;

identifying, by the first network device, a channel, of a network layer of an Open Systems Interconnect ("OSI") model, via which the traffic was received, the identifying including identifying whether the traffic was received via:

a first network layer channel associated with time-sensitive traffic, or a second network layer channel associated with traffic that is less time-sensitive than traffic associated with the first network layer channel, the first and second network layer channels being different channels;

selecting, by the first network device, a paging scheme associated with the identified channel, the selecting including:

selecting a first paging scheme when the traffic was received via the first network layer channel, and selecting a second paging scheme when the traffic was received via the second network layer channel, the first paging scheme being more aggressive than the second paging scheme; and outputting, by the first network device and to a second network device, information regarding the selected first or second paging scheme, the information regarding the selected paging scheme causing the second network device to page the user device using the selected paging scheme.

16. The method of claim 15, wherein the second network device includes a mobility management entity ("MME") of a long term evolution ("LTE") network.

17. The method of claim 15, further comprising:

receiving, from the second network device, bearer information regarding the user device; and outputting the traffic to the user device, wherein the outputting includes utilizing the bearer information.

18. The method of claim 17, wherein the bearer information includes information identifying a channel, of a link layer of the OSI model, between the first network device and the user device.

19. The method of claim 15, wherein the first paging scheme causes the second network device to page a first quantity of base stations, wherein the second paging scheme causes the second network device to page a second quantity of base stations, wherein the first quantity is greater than the second quantity.

* * * * *